C. E. STRIFLER.
TIRE HOLDING DEVICE.
APPLICATION FILED APR. 11, 1916.
1,234,409. Patented July 24, 1917.
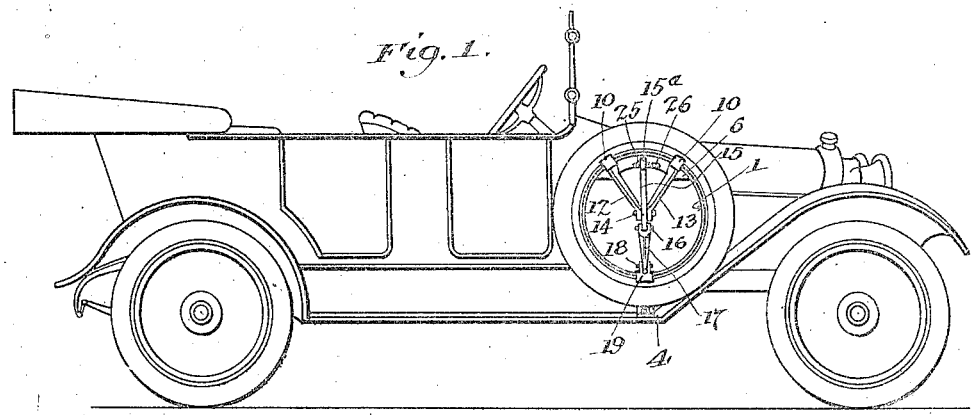
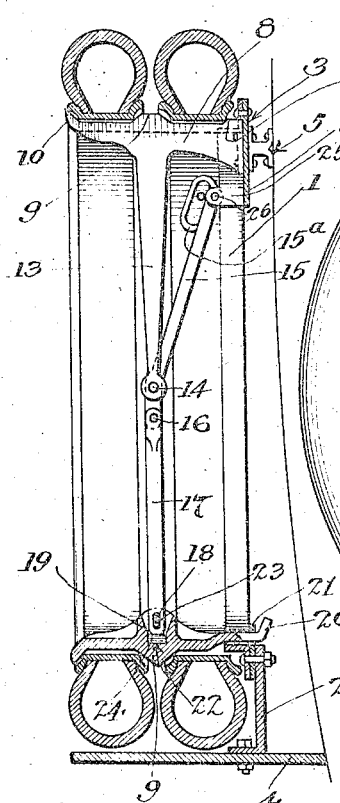
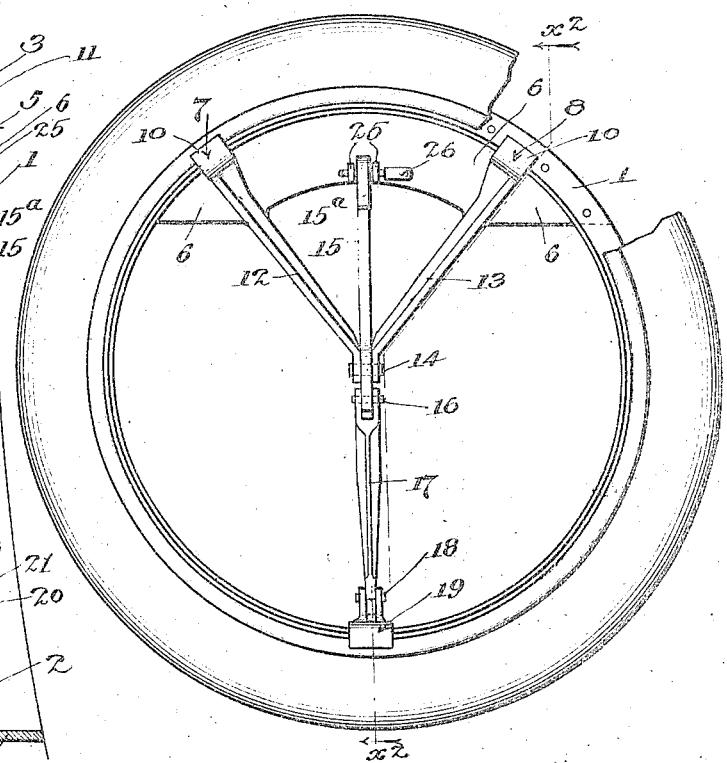
Witnesses:
Inventor.
Chester E. Strifler
By Frederick Whyper
Attorney

UNITED STATES PATENT OFFICE.

CHESTER E. STRIFLER, OF ALHAMBRA, CALIFORNIA.

TIRE-HOLDING DEVICE.

1,234,409.      Specification of Letters Patent.      Patented July 24, 1917.

Application filed April 11, 1916. Serial No. 90,364.

*To all whom it may concern:*

Be it known that I, CHESTER E. STRIFLER, a citizen of the United States, residing at Alhambra, county of Los Angeles, and State of California, have invented a new and useful Tire-Holding Device, of which the following is a specification.

This invention relates to improvements in devices for holding extra tires upon an automobile and the primary object is to provide a device of this character which is simple as to construction, inexpensive to manufacture and which does not require the use of special tools or the expenditure of much time in the securing or removing of a tire.

Another object of this invention is to provide a tire holding device of the character described which, while being of simple and light construction, will serve to rigidly hold extra tires upon an automobile and which may be quickly operated to secure and release the tire.

Other objects and advantages may appear from the subjoined detail description:

The accompanying drawings illustrate the invention:

Figure 1 is a side elevation of an automobile showing my invention as it would appear when in use;

Fig. 2 is an enlarged vertical sectional view of the device showing tires supported thereon and the device connected to an automobile;

Fig. 3 is the front elevation of the device showing a portion of the tire thereon broken away.

Referring to the drawings by characters of reference, 1 designates the main supporting element of the device which is in the form of an angle iron ring. This ring is secured by suitable means 2 and 3 at its lower and upper sides respectively to the running-board 4 and side portion 5 of an automobile as shown in Fig. 2 of the drawings.

An arcuate plate 6 is secured to the upper side of the ring 1 and depends therefrom. Carried by this plate and projecting outwardly therefrom are horizontal tire supporting brackets 7 and 8 which are spaced considerably from one another and located approximately in the same plane. These brackets are preferably constructed so as to act as a support for the two tires as shown in Fig. 2 of the drawings, there being provided intermediate the ends of the brackets transverse ribs 9 which are designed to abut opposed inner edges of the tires and to space the tires from one another. An up-turned retaining flange 10 is formed on the free end of each bracket and a corresponding flange 11 is formed on the inner end of each bracket.

Depending from the brackets 7 and 8 are arms 12 and 13 which are preferably formed integral with the brackets and converge toward their lower ends, said lower ends being located adjacent to the center of the ring 1. The arms 12 and 13 and brackets 7 and 8 are preferably cast.

Pivoted intermediate its ends as at 14 to and between the lower ends of arms 12 and 13 is an operating lever 15 provided with a hand grip 15ª. To the lower end of the lever is pivoted as at 16 a link bar 17. The link bar 17 is in turn pivoted as at 18 to a hinged tire clamp 19. The clamp 19 is formed similarly to the brackets 7 and 8 and at its inner end is upturned as at 20. The upturned inner end 20 is inserted through an opening formed in a plate 21 which is secured to the lower side of the ring 1 and this construction provides for the hinging of the clamp 19. The clamp 19 on its upper face is formed with a socket 22 which receives the lower end of the link bar 17. In this connection it will be noted that the link bar 17 is formed with a slot 23 which receives the pivot 18, the latter being inserted through the slot 22. A shim 24 may be placed between the lower end of the bar 17 and in the inner end of the socket 22 so as to compensate for any wear on the device and provide for an effective clamping action.

Carried by the plate 6 and extending outwardly therefrom are spaced apertured extensions 25 between which the lever 15 is adapted to lie when the device is in operative position. A padlock or other suitable device, 26, is provided to lock the lever 15 in operative position.

Prior to the securing of tires upon the device the lever 15 is in down position and the weight thereof holds the clamp 19 in up-position. Tires to be held are placed upon the brackets 7 and 8 so as to surround the clamp 19. The ring 1 serves as a guide in positioning the innermost tire to be held in position and extends within the rim on said tire when the latter is clamped in place. Thus the tire is centered and may be readily clamped in position when first placed over the clamping means upon the ring. It will be noted that the rims of the tires will fit between the flanges 10 and 11 and the ribs 9 on the brackets 7 and 8. This particular construction of the brackets 7 and 8 provides for the proper positioning of the tires as soon as they are placed thereon. To lock the tires upon the device the lever 15 is moved upwardly and this causes the link 17 and clamp 19 to be moved upwardly into engagement with the tires as shown in Figs. 2 and 3 of the drawings. When the lever is in upright position the clamp 19 firmly holds the tires in position and the lever may be locked by the padlock 26 so as to hold the tires securely upon the device. It will be seen that to move the device it is only necessary to unlock the member 26 and swing the lever downward so as to raise the clamp member 19. When this is done the tires are free to be removed.

It will be seen with reference to the foregoing description and accompanying drawings, that I have provided a simple and quickly operable device for holding extra tires upon an automobile. While I have shown the tire holding device attached to the side of an automobile, it is understood that the device may be secured at any desirable point.

I claim:

1. A tire holding device comprising a ring adapted to be secured to an automobile, tire supporting brackets carried by the ring and extending outwardly therefrom for engagement with the inner sides of a tire to support the tire free from engagement with the ring, a tire clamp hingedly connected with the ring adapted to engage the inner side of a tire to hold it in position upon the brackets, said ring extending within the tire and being spaced circumferentially from the tire, said brackets and clamp adapted to be surrounded by the tire, and means to move the clamp into position for engagement with the tire.

2. A tire holding device comprising a ring adapted to be secured to an automobile, tire supporting brackets carried by the ring on one side thereof, arms carried by the brackets extending toward the center of the ring, a lever pivoted intermediate its ends to said arms, a tire clamp hingedly connected with the ring at a point opposite the brackets, a link pivotally connected with the lever and clamp and means to lock the lever in clamping position.

3. A tire holding device comprising a ring adapted to be secured in vertical position upon an automobile, tire supporting brackets secured to and extending outwardly from the ring adjacent the upper side thereof, downwardly converging arms carried by the brackets, a lever pivoted intermediate its ends to said arms, a tire clamping device hinged to the ring at a point opposite to the brackets, said brackets and clamping member being adapted to be surrounded by tires placed upon the bracket, a link pivotally connected with the lever and tire clamping member, and retaining flanges on the outer ends of the brackets and clamping member for engagement with a tire.

4. A tire holding device comprising a main supporting element, tire supporting brackets secured to said element, arms carried by the brackets and converging downwardly, a lever pivoted intermediate its ends to and between said arms at the lower ends thereof, a tire clamp hingedly connected with the supporting element at a point opposite the brackets, a link pivotally connected with the lever and clamp, and means to lock the lever in position to hold a tire upon the brackets.

5. A tire holding device comprising a ring adapted to be secured to an automobile, tire supporting brackets carried by the ring on the upper side thereof, arms carried by the brackets and converging downwardly, a lever pivoted intermediate its ends to and between said arms at the lower ends thereof, a tire clamp hingedly connected with the ring at a point opposite the brackets, a link pivotally connected with the lever and clamp, a plate secured to the upper side of the ring and depending therefrom, lugs on said plate to receive said lever, and means to lock said lever to said lugs to hold a tire upon the brackets.

Signed at Los Angeles, Cal., this 4th day of April, 1916.

CHESTER E. STRIFLER.

Witnesses:
 CHAS. J. CHUNN,
 M. L. OWEN.